US006888493B2

United States Patent
Driessen et al.

(10) Patent No.: US 6,888,493 B2
(45) Date of Patent: May 3, 2005

(54) MULTI-TARGETS DETECTION METHOD APPLIED IN PARTICULAR TO SURVEILLANCE RADARS WITH MULTI-BEAMFORMING IN ELEVATION

(75) Inventors: Hans Driessen, Goor (NL); Wietze Meijer, Enschede (NL); Jitse Zwaga, Hengelo (NL)

(73) Assignee: Thales Nederland B.V., Hengelo (NL)

( * ) Notice: Subject to any disclaimer, the term of this patent is extended or adjusted under 35 U.S.C. 154(b) by 103 days.

(21) Appl. No.: 10/400,072

(22) Filed: Mar. 27, 2003

(65) Prior Publication Data

US 2004/0027274 A1 Feb. 12, 2004

(30) Foreign Application Priority Data

Apr. 2, 2002 (NL) .............................................. 1020287

(51) Int. Cl.[7] .............................................. G01S 13/72
(52) U.S. Cl. .............................. 342/91; 342/95; 342/96; 342/195
(58) Field of Search .......................... 342/90, 91, 93, 342/94, 95, 96, 97, 107, 113, 115, 134, 135, 139, 140, 146, 158, 189, 194, 195

(56) References Cited

U.S. PATENT DOCUMENTS

| 3,731,304 | A | | 5/1973 | Caspers et al. |
| 4,335,383 | A | * | 6/1982 | Berry ......................... 342/115 |
| 5,020,411 | A | * | 6/1991 | Rowan ........................ 89/1.11 |
| 5,124,710 | A | * | 6/1992 | Debuisser .................... 342/204 |
| 5,559,515 | A | * | 9/1996 | Alimena et al. ............ 342/118 |
| 6,243,037 | B1 | * | 6/2001 | Pulford et al. ................ 342/95 |
| 2004/0027274 | A1 | * | 2/2004 | Driessen et al. .............. 342/91 |

FOREIGN PATENT DOCUMENTS

| EP | 0 709 694 A | 5/1996 |
| EP | 1351069 A1 * | 10/2003 ........... G01S/7/292 |

OTHER PUBLICATIONS

"A high–speed real–time digital signal processor for the modulated frequency stepped pulse radar signal", Teng Long; Fanghui Dan Li; WCCC–ICSP 2000. 5th Int'l Conf, vol.: 3, Aug. 21–25, 2000 Ps:1847–1850.*

Jenifer L. Harmon, Texas Instruments "Track–Before–Detect Performance For a High Prf Search Mode" 1991, 5 pages.

J. David R. Kramer, Jr. Wallace S. Reid The MITR Corporation "Track–Before–Detect Processing for a Range–Ambiguous Radar" 1993; 4 pages.

* cited by examiner

Primary Examiner—John B. Sotomayor
(74) Attorney, Agent, or Firm—Lowe Hauptman Gilman & Berner, LLP

(57) ABSTRACT

A radar comprising transmitter means for generating bursts of radar pulses, each scan of a radar consisting of a number ($N_b$) of bursts, the method comprises, for each scan k:

a first step, in which a radar cell is pre-selected in a validation gate;

a second step, in which a Track-Before-Detect processing is initialized upon the pre-selected cells, using a track filter to construct the validation gate associated to the next scan k+1;

the steps being repeated scan to scan.

The invention can be applied to surveillance radars, for example with multi-beamforming in elevation, and more generally to all kinds of radars.

24 Claims, 4 Drawing Sheets

MULTI-TARGETS DETECTION METHOD APPLIED IN PARTICULAR TO SURVEILLANCE RADARS WITH MULTI-BEAMFORMING IN ELEVATION

The invention relates to a radar method for detecting targets. It can be applied to surveillance radars, for example with multi-beamforming in elevation, and more generally to all kinds of radars.

In our example as given here, a surveillance radar consists of a multi-beam radar with a rotating antenna, of which mission is to detect targets at a long range. Conventionally, target tracks are formed by combining target plots extracted from the received radar signal in separate scans using a track filter and a track initiation logic.

Then, traditional target detection involves thresholding at three stages: signal strength thresholding on hit level, thresholding after binary integration on plot level, and thresholding after binary integration on track level. Target detection in a single scan of a surveillance radar system is performed by binary integration of target detections, so-called hits, in consecutive coherent processing intervals of a scan. Each scan of a surveillance radar consists of a large number of coherent processing intervals, or bursts, each covering a bearing interval. Since the radar beamwidth in bearing typically is several times the size of the bearing interval covered by a burst, target signal will be present in a number of consecutive bursts of a scan, the $N_b$ bursts on target. In case of a pulse-doppler surveillance radar, the received signal in a range-doppler frame is obtained from each burst after appropriate range sampling and application of a doppler filter bank. At a certain range and doppler speed in this frame a hit detection is declared if the received signal is above the threshold guaranteeing a predetermined constant false alarm probability on hit level.

A target detection in a scan, a plot, is declared if for the same range and doppler speed there are $N_h$ hits in $N_b$ consecutive bursts. In case the signal is received using simultaneous electronic multi-beamforming in elevation, it is also required that the hits originate from the signal received in the same elevation beam. The parameters $N_h$ and $N_b$, and the threshold on hit level are chosen such that a certain false alarm probability on plot level is guaranteed.

Next, a target plot is used to initialize a track filter. The track filter prediction for subsequent scans is used to identify possible target plots that can be associated to the track. After $N_s$ scans (including the scan that produced the initial plot), confirmed target track detection is declared if there are $N_p$ plots out of the possible $N_s$ associated to the track. The parameters $N_p$ and $N_s$, and the false alarm probability on plot level are chosen such that a certain false alarm probability on track level is guaranteed.

An other solution for detecting targets consist in replacing the conventional three-stage track detection scheme by the single stage Track-Before-Detect scheme, so-called TBD, involving only signal strength thresholding on track level. In this TBD scheme, one aims to threshold the integrated target signal present at the targets elevation, range, and doppler in the $N_b$ bursts on target of the $N_s$ scans over which we integrate. It is well known that by delaying the thresholding and thereby allowing the target signal to build up, a large improvement in detection probability can be achieved over traditional multi-stage track detection schemes at equal false alarm probability. Track-Before-Detect scheme is for example described in Blackman, S. S. and Popoli, R <<Design and Analyses of Modern Tracking Systems >>, Norwood, Mass.: Artech House, 1999.

Four-dimensional measurement space can be defined as partitioned in range-bearing-elevation-doppler cells, or radar cells. The size of a radar cell is equal to that of the range-doppler bin in range and doppler, the bearing interval of a burst in bearing, and the elevation beamwidth in elevation. The radar cell centers coincide in range and doppler with the centers of the range-doppler bins of the range-doppler frame, and in elevation with the elevation beam centers. In case of an odd number of bursts on target $N_b$, the radar cell centers in bearing coincide with those of the bearing intervals of the bursts. In case of an even number of bursts on target however, the radar cells are centered on the borders of the bearing intervals of the bursts. This allows to define the measured signal in a radar cell to be the summation of the $N_b$ power measurements of the $N_b$ bursts closest to the radar cells bearing in the range-doppler bin and elevation beam corresponding to the radar cells range, doppler, and elevation. As such, one can project the signal integrated over the bursts on target into the radar cells.

Returning to the subject of TBD for surveillance radar, the problem encountered in practice is first of all that each radar cell of a scan could be the origin of a new track, which after processing of $N_s$ scans may lead to a track detection. Depending on the surveillance radar parameters such as the range coverage and range gate size, and the number of bursts per scan, the number of radar cells in a scan and thus the number of potential starting points can amount to $10^9$. Starting from a radar cell, the four-dimensional area the target may have moved to may well consist of several hundred radar cells in the next scan, which number increases exponentially with each scan in the integration period. Thus, next to the problem of the sheer amount of potential starting points each scan, it is also a problem to find the target signal in the next scans of the integration period.

When applied to electro-optical sensors where TBD has two-dimensional frames of data as input at a relatively high update rate, the problem of finding the target signal over multiple frames can still be tackled by relying on brute-force techniques. Starting from all pixels in the first frame of the integration period, these techniques simply integrate the pixel intensities in the next frames for all dynamically possible target trajectories. Due to the large update rate, the integration time is relatively short allowing the dynamically possible target trajectories to be restricted to constant velocity trajectories. Since in most cases the maximum number of pixels a target can move during the integration time is small, the number of discrete velocities leading to a unique pixel intensity sum will be limited allowing further restriction of the number of possible trajectories to be tried. Examples of these brute-force techniques are the Hough transform (as described in Smith, M. C. <<Feature Space Transform for Multitarget Detection>> Proc. IEEE Conf. On Decision and Control, Albuquerque, N. Mex., December 1980, pp. 835–836), velocity filter banks (as described in Stocker, A. D. and Jansen, P. <<Algorithms and Architectures for Implementing Large Velocity Filter Bank>> Proc. SPIE Conf. On Signal and Data Processing of Small Targets, 1991, pp. 140–155), and dynamic programming algorithms (as described for example in Arnold J. et al <<Efficient Target Tracking Using Dynamic Programming>> IEEE Trans. On Aerospace and Electronics Systems, vol. 29, no 1, January 1993, pp. 44–56).

As previously mentioned, the TBD techniques applied, however, are brute-force techniques trying out all possible target trajectories during the integration time. For electro-optical sensors, this is feasible because these sensors are two-dimensional and have high update rates.

In the literature, some cases can be found where these brute-force techniques have been applied to radar systems, as described for example in Urkowitz, H and Allen, M. R. <<Long Term Noncoherent Integration Across Resolvable Sea Clutter Areas>> Proc. National Radar Conf., 1989, pp. 67–71. To arrive at practically feasible processing demands using brute-force techniques, it is necessary to reduce the problem to two dimensions by considering only radial target trajectories. When the application concerns a track or multi-function radar, the increased update rate as compared to that of surveillance radar reduces the growth of the potential target area during the integration period. Also the amount of data to be processed is in most cases greatly reduced by using as input for the actual TBD processing not the raw measured data, but only those data points that have exceeded a predetection threshold.

When applied to radar systems, the brute-force techniques are confronted with a much larger amount of data each scan and a much larger amount of possible target trajectories during the integration time. The resulting processing power requirement can not be met.

It is an aim of the invention in particular to overcome this problem of too high processing power requirements.

The mains advantages of the invention are that it does not reduce the detection performance compared to a true Track-Before-Detect technique, it can be used to increase detection performance for any sensor system where processing power limitations render brute-force track-before-detect architectures useless in practice and it is simple to implement.

Other features and advantages of the invention shall appear from the following description made with reference to the appended drawings, of which:

According to the invention, a preselection mechanism is in a first step used. This preselection mechanism solely identifies radar cells in a scan for which it might be worth to initiate a TBD processing. So upon a preselection, the TBD algorithm is initialized and the raw radar video is processed for a limited number of scans backward and forward. Thus, starting from a preselection, raw measured data is processed and only integrated signal strength thresholding on track level will take place, as intended in a true TBD scheme.

Figure 1:
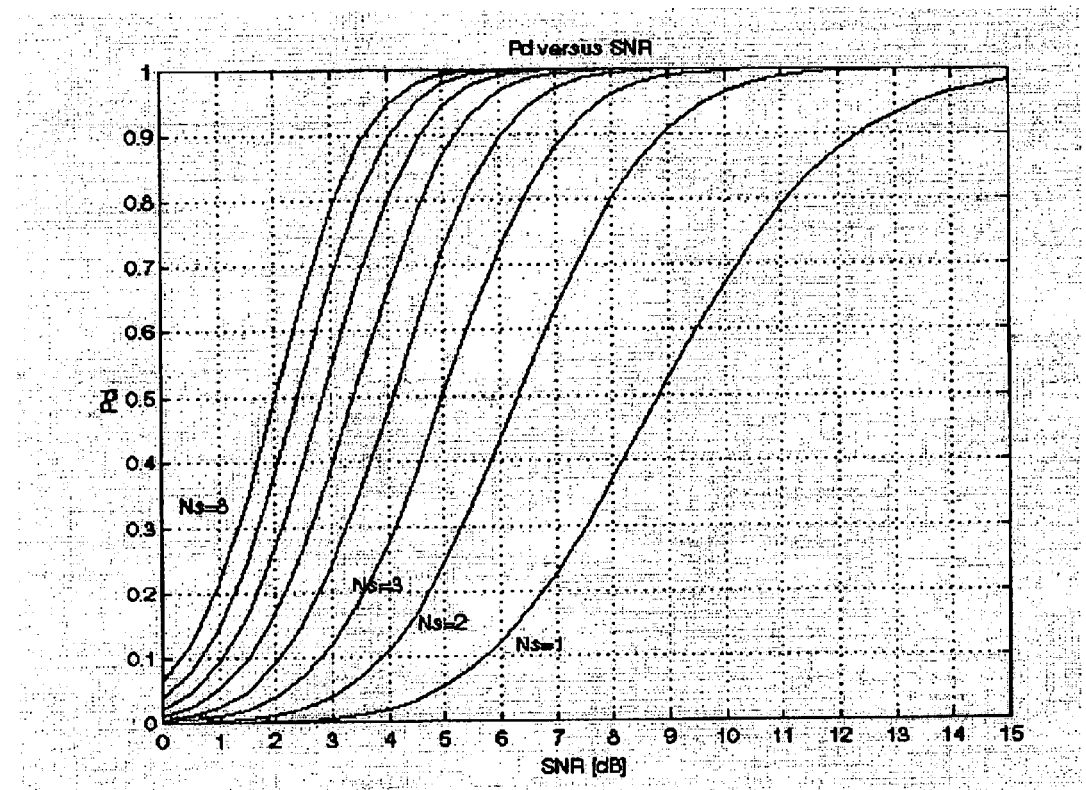
FIG. 1 shows theoretical detection probability of TBD for a surveillance radar.

FIG. 1 shows a theoretical detection probability of TBD for surveillance radar versus Signal to Noise Ratio (SNR). The theoretical detection probability Pd of TBD for surveillance radar has been plotted versus SNR for a range of integrated scans $N_s = \{1, \ldots 8\}$. The number of bursts on target each scan is for example set to $N_b = 4$.

In FIG. 1, in each case a threshold on track level $\lambda_t$ is used corresponding to a false alarm probability on track level of $P_{FA}{}^t = 10^{-10}$, as also results from the typical conventional track initiation criteria of 2 plots out of 2 scans with a false alarm probability on plot level of $10^{-5}$.

From FIG. 1, it appears that the increase in detection probability diminishes with each more added scan to the integration interval, the largest increase clearly coming from the first few added scans. Keeping in mind that an increase in integration period also increases the reaction time, the number of scans in the integration period has been restricted to $N_s = 4$ in the coming numerical examples.

The method according to the invention approaches the theoretical detection performance for TBD algorithm. The preselection stage allows to significantly reduce the number of radar cells to be considered each scan at a minimal performance reduction. To approach the theoretical detection performance of TBD for a surveillance radar, the statistics of the integrated target signal, for example the probability density function, that would be output by an ideal TBD processing are considered. Assuming the integration is over $N_s$ scans with $N_b$ bursts on target each scan, the integration sumE to be thresholded is equal to a sum of $N_s N_b$ independent Rayleigh distributed power measurements $x_i$:

$$SumE = \sum_{k=1}^{Ns} \left[ \sum_{b=1}^{Nb(k)} x(k, b) \right] \quad (1)$$

Assuming furthermore that the $x_i$ are normalized with respect to the level of the Rayleigh distributed background noise and have linear Signal to Noise Ratio, so-called SNR, noted $\rho$, then the probability density function, so-called pdf, noted $p_1(x)$ for all $x_i$ is equal to:

$$p_1(x) = \frac{1}{1+\rho} \exp\left(-\frac{x}{1+\rho}\right) \quad (2)$$

If a threshold equal to $\lambda_h$ is applied to a power measurement x, corresponding to hit detection discussed previously, the detection probability $P_D{}^h$ is given by:

$$P_D^h = \Gamma\left(\frac{\lambda_h}{1+\rho}, 1\right) \quad (3)$$

where $\Gamma$ is the incomplete gamma function defined as $$\Gamma(\lambda, N) = \int_\lambda^\infty t^{N-1} \exp(-t) dt.$$

The pdf of noise-only power samples $p_0(x)$ and the false alarm probability $P_{FA}{}^h$ for a threshold of $\lambda_h$ are obtained by substituting a SNR of $\rho = 0$ in (2) and (3), then $P_0(x) = \exp(-x)$ and $P_{FA}{}^h = \Gamma(\lambda_h, 1)$.

In the TBD scheme the integration sum sumE given by (1) is thresholded leading to a track detection. For the theoretical detection probability $P_D{}^t$ and false alarm probability $P_{FA}{}^t$ of TBD when applying a threshold $\lambda_t$, one simply has to take into account that now a sum of $N_s N_b$ power measurements distributed according to (2) is thresholded instead of a single one:

$$P_D^t = \Gamma\left(\frac{\lambda_t}{1+\rho}, N_s N_b\right) \quad (4)$$

and $$P_{FA}{}^t = \Gamma(\lambda_t, N_s N_b). \quad (5)$$

According to the invention, a preselection scheme is used to overcome the problem that for each radar cell of each scan a computationally expensive TBD algorithm should be started. In the preselection scheme, a preselection initializes a TBD algorithm that recursively processes $N_S - 1$ scans back and subsequently $N_S - 1$ scans forward. As such a preselection leads to $N_s$ unique correlated integration periods: of the first integration period the scan the preselection originated from is the last one, and of the last integration period it is the first scan. Also going backward, processing previous scans, is needed to arrive at an acceptable detection loss on track level due to preselection. It does however require the radar video of the last $N_s$ scans to be available, i.e. stored in memory. To calculate the theoretical detection probability of TBD using this preselection scheme, it is taken into account in equation (4) and (5) the restriction that in at least one of the scans the integration sum over the $N_b$ bursts on target must have exceeded the preselection threshold $\lambda_p$:

$$P_D = \sum_{n_s=1}^{N_s} \left[ (-1)^{n_s+1} \binom{N_s}{n_s} \exp\left(-\frac{\lambda_p}{1+\rho} n_s\right) \sum_{n_b^1=1}^{N_b-1} \sum_{n_b^2=1}^{N_b-1} \cdots \sum_{n_b^{n_s}=1}^{N_b-1} \left\{ \Gamma\left(\frac{\lambda_t}{1+\rho}, N_s N_b - n_s(N_b-1) + \sum_{i=1}^{n_s} n_b^i\right) \frac{\left(\frac{\lambda_p}{1+\rho}\right)^{n_s(N_b-1) - \sum_{i=1}^{n_s} n_b^i}}{\prod_{i=1}^{n_s} (N_b - 1 - n_b^i)!} \right\} \right] \quad (6)$$

and $$P_{FA} = \sum_{n_s=1}^{N_s} \left[ (-1)^{n_s+1} \binom{N_s}{n_s} \exp(-\lambda_p n_s) \sum_{n_b^1=1}^{N_b-1} \sum_{n_b^2=1}^{N_b-1} \cdots \sum_{n_b^{n_s}=1}^{N_b-1} \left\{ \Gamma\left(\lambda_t, N_s N_b - n_s(N_b-1) + \sum_{i=1}^{n_s} n_b^i\right) \frac{\lambda_p^{n_s(N_b-1) - \sum_{i=1}^{n_s} n_b^i}}{\prod_{i=1}^{n_s} (N_b - 1 - n_b^i)!} \right\} \right] \quad (7)$$

Figure 2:
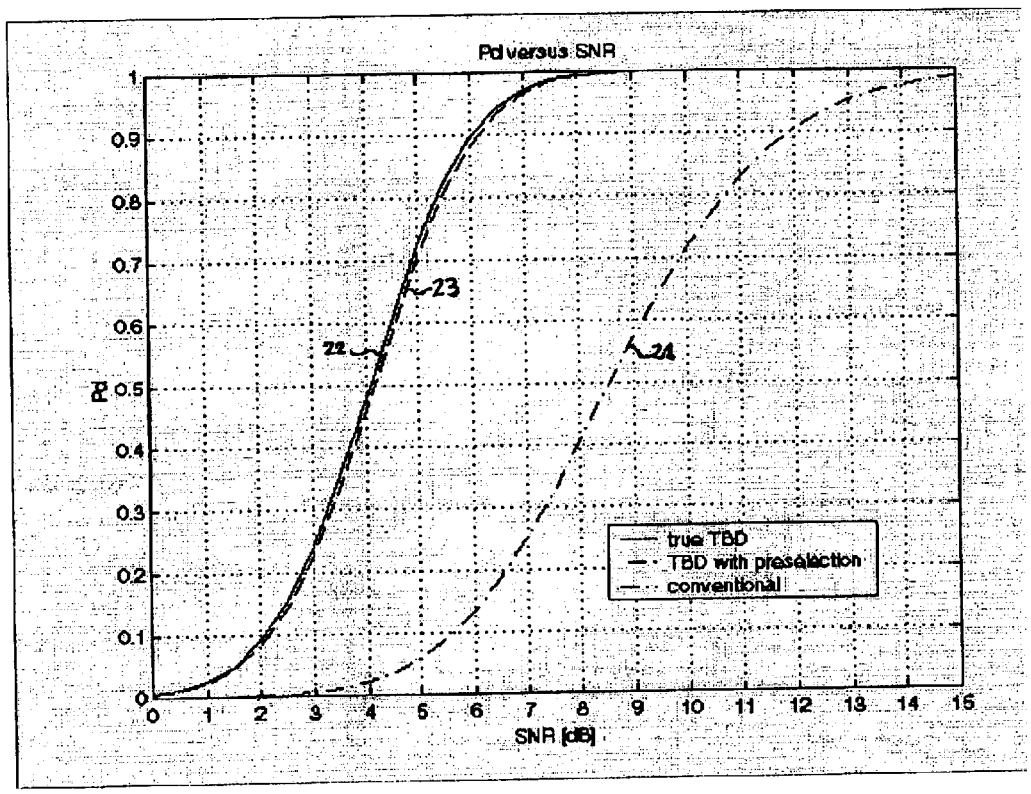
FIG. 2 shows theoretical detection probability of TBD for a surveillance radar with and without preselection, and the detection probability on track level using a conventional detection scheme.

In FIG. 2, the theoretical detection probability of TBD has been plotted versus SNR, with and without preselection. The false alarm probability on track level is again set for example to $P_{FA}{}^t = 10^{-10}$, and the number of integrated scans $N_s$ is for example equal to 4. A preselection threshold $\lambda_p$ corresponding to a false alarm probability of $P_{FA}{}^P = 2.5 \cdot 10^{-4}$ is for example used, achieving a reduction of 99,975% in number of TBD algorithms to be started each scan. Also the detection probability for a conventional three-stage track detection scheme over four scans is plotted and represented through a curve 21. In the conventional detection scheme one applies for example 3 out of 4 scans binary detection criterion on track level, 3 out of 4 burst binary detection criterion on plot level, and a threshold on hit level $\lambda_h$ corresponding to a false alarm probability of $P_{FA}{}^h = 4,2266 \cdot 10^{-2}$. As such, the false alarm probability on track level for the conventional detection scheme also is equal to $10^{-10}$.

From FIG. 2, it appears that the potential gain in detection performance when using a TBD detection scheme instead of a conventional detection scheme is significant. The true TBD detection is represented through a curve 22. With the TBD algorithm a detection probability of $P_D{}^t = 0.9$ is achieved at a 6 dB lower SNR than when a conventional detection scheme is used. This means that the detection range is extended with more than 40% by using a TBD scheme. Furthermore, FIG. 2 shows that by using the proposed preselection scheme corresponding to a curve 23, applicant has pointed out that a negligible loss in detection performance is experienced.

In a next step, according to the invention, the TBD algorithm that is initialized by a preselection uses the corresponding radar cells range, doppler, bearing and elevation to initialize a recursive track filter. In each scan the radar cells in the track filters validation gates are searched for target presence based on the track filter prediction and the previously measured SNR, and a radar cell is selected to update the track filter with. Through updating of the track filter, the area to be searched by the TBD algorithm, the validation gate, is kept at a minimum. Without updating, the area the target may have moved to would grow exponentially with each additional scan of the integration period. Finally, the integrated signal over the selected radar cells is thresholded.

To achieve the detection probabilities presented previously, it is necessary to integrate the target signal over multiple scans. In a recursive filtering based TBD approach, this requires the prediction of the target position in the next scan using the target positions in the previous scans in a trackfilter, or only the target position indicated by the preselection plot. Three errors sources that hinder the prediction process can be identified:

Measurement errors: both associated with target positions in the past, which have been propagated in the trackfilter, and the measurement errors associated with the target position it is about to be detected;

Target maneuvers: during the time between two scans, the scan time, the target may initiate a maneuver. Since the scan time is in order of seconds, a target maneuver can cause the target position in a scan to significantly deviate from the prediction;

Mis-associations: associating clutter, noise peaks, or signal of a different target to the track causes the outcome of the trackfilter to deviate from the true target trajectory.

Conventionally, one deals with the combined uncertainty caused by these error sources by not only considering the exact prediction point for association, but also a region around it: the validation gate. When constructing the validation gate one, on the one hand, tries to accomplish that the true target position almost certainly lies within it. On the other hand, one tries to keep the validation gate as small as possible, so as to restrict the number of plots that have to be considered for association with the track. Another reason to restrict the size of the validation gate is that a plot far from the prediction point is more likely to have originated from a different target, clutter, or noise.

While conventional processings use the validation gate to select which of the plots are considered for association with the track, the method according to the invention uses it in recursive filtering based TBD algorithms to select which data of a scan is considered for association. As such, not only data that would have to lead to a plot is selected, but all the data within the validation gate as intended in a true TBD processing.

An other approach consists for example in thresholding on the integrated likelihood instead of on the integrated signal strength. In this case, the integrated signal strength together with the position data is for example used to calculate a likelihood. This likelihood together with the likelihood of other scans is used for thresholding on track level. The integrated likelihood over Ns scans to be thresholded, leading to a track detection, is equal to the product of the likelihoods of the separate scans. The track is for example deleted when the over Ns scans integrated likelihood is below the threshold for a number of consecutive scans.

Figure 3:
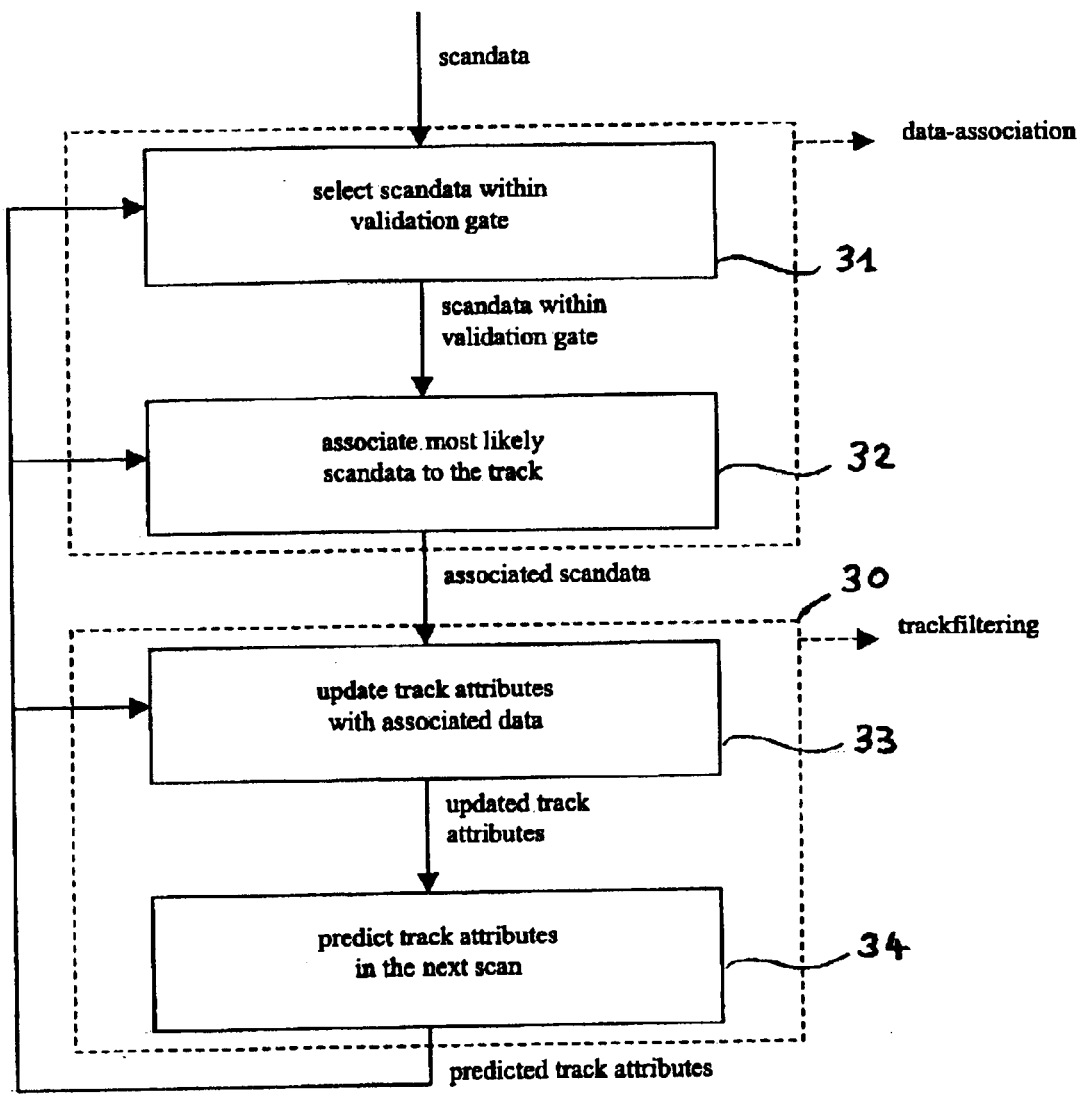
FIG. 3 shows a block diagram of the basic approach to recursive filtering based TBD algorithm.

The block diagram of FIG. 3 summarizes the basic approach to recursive filtering based TBD algorithm. Given that it is known how to construct the validation gate, in a first step 31 the data that has to be considered for association are selected from each scan. The next step 32 actually associates from the data within the validation gate the data that is most likely to have originated from the target in the track. It is possible for example to base this on the distance to the prediction point, and the observed signal strength, using whatever information available about the targets maneuverability and target signal strength. A trackfilter algorithm 30 has the outcome of the association algorithm 31, 32 as input. In a first step 33, the trackfilter algorithm update track attributes with the associated data. In particular, the term <<track attributes>> stands for the kinematic aspects of a track, such as the position and velocity, and the energetic aspects, such as the SNR and the integration sum. In a next step 34 the algorithm predicts track attributes in the next scan from the updated track attributes. The predicted track attributes that outcome from this last step 34 are also inputs of previous steps 31, 32, 33.

The block diagram of FIG. 3 represents the track maintenance stage. When initiating a track, the method according to the invention bases the updated track attributes on the attributes of the preselection plot. The process of FIG. 3 is then first applied backward in time, retrodicting, instead of predicting, to the previous scans to be processed. After those scans have been processed, the first integration period to be tried for track initiation is available. Next, the processing continues forward in time from the scan the preselection originated from, and the integrated signal over subsequent integration periods is thresholded. If none of the first $N_s$ integration periods leads to detection, the track initiation is stopped. Otherwise, the track maintenance phase is entered. A track is deleted when the integration sum is below the threshold for a number of scans in a row (this number can be a design parameter). As previously indicated, the outcome of the trackfiltering, the predicted track attributes, is used in the data-association to construct the validation gate and select the data to be associated from within it.

A logical candidate for tracking the kinematic attributes is for example the Kalman filter, since it is recursive, provides estimation error characteristics upon which the data-association can be based, and is cheap in terms of processing load. Furthermore, in the literature it is possible to find various Kalman filter based trackfilters, designed to deal with multiple and/or weak plots, that can be used to derive possible TBD trackfilters from, such as described for example in Lerro, D and Bar-Shalom, Y "Automated Tracking with Target Amplitude Information" Proc. American Control Conference, San Diego, Calif., 1990, pp.2875–2880 or in Zwaga, J. H. and Driessen, H. "An Efficient One-Scan-Back PDAF for Target Tracking in Clutter", Proc. SPIE Conf. On Signal and Data Processing of Small Targets, 2001, pp. 393–404.

The target SNR can simply be tracked using the, possibly weighted, average over the last scans. Depending on the relative range rate of the target during the averaging period, one has to correct for $1/r^4$ change in SNR with changing range r. For the length of the averaging period to be used, it is necessary to find a compromise between averaging out the Radar Cross Section (RCS) fluctuations (modeled for example as Rayleigh distributed) and being able to follow temporal changes in the RCS, for example due to changes in the aspect angle. Averaging out RCS fluctuations speaks for a long averaging period, whereas being able to follow temporal changes in the RCS speaks for a short averaging period.

Assuming that an estimate of the target SNR, or better the unnormalized target amplitude $\overline{A}$ for the next scan is available, one derives an expression for the likelihood ratio $L_{S|T}$ that the integration sum (over $N_b$ bursts) associated with a radar cell is target originated. The probability $p_{s|t}$ that the measured amplitudes $A_{k+1}^i$ that contribute to the integration sum of a range-doppler cell in scan k+1 are target originated is given by $$p_{s|t} = \sum_{i=1}^{N_b} \frac{2A_{k+1}^i}{\overline{A}_{k|k,\ldots,k-(N_s-1)}^2} \exp\left[\frac{-(A_{k+1}^i)^2}{\overline{A}_{k|k,\ldots,k-(N_s-1)}^2}\right] \quad (8)$$

where $\overline{A}_{k|k,\ldots,k-(N_s-1)}$ is estimated by taking the root mean squared amplitude of the last $N_s$ scans, as indicated.

The probability $p_{s|n}$ that the measured amplitudes are noise generated is given by $$p_{s|n} = \prod_{i=1}^{N_b} \frac{A_{k+1}^i}{\sigma^2} \exp\left[\frac{-(A_{k+1}^i)^2}{2\sigma^2}\right] \quad (9)$$

where $2\sigma^2$ is the background noise level.

Thus, the likelihood ratio $L_{S,T}$ based on the measured signal strength is given by $$L_{S|T} = \frac{p_{s|t}}{p_{s|n}} = \frac{\prod_{i=1}^{N_b} \frac{2A_{k+1}^i}{\overline{A}_{k|k,\ldots,k-(N_s-1)}^2} \exp\left[\frac{-(A_{k+1}^i)^2}{\overline{A}_{k|k,\ldots,k-(N_s-1)}^2}\right]}{\prod_{i=1}^{N_b} \frac{A_{k+1}^i}{\sigma^2} \exp\left[\frac{-(A_{k+1}^i)^2}{2\sigma^2}\right]} \quad (10)$$

which can be simplified to $$L_{S|T} = \left(\frac{2\sigma^2}{\overline{A}_{k|k,\ldots,k-(N_s-1)}^2}\right)^{N_b} \exp\left[\left(1 - \frac{2\sigma^2}{\overline{A}_{k|k,\ldots,k-(N_s-1)}^2}\right) \sum_{i=1}^{N_b} \frac{(A_{k+1}^i)^2}{2\sigma^2}\right] \quad (11)$$

where the summation over $(A_{k+1}^i)^2/(2\sigma^2)$ is the integration sum over the $N_b$ bursts associated with the radar cell.

Next, assuming that the predicted target state vector $s_{k+1|k}$ with associated error covariance $P_{k+1|k}$ is available (as is the case when a Kalman filter is used for trackfiltering), one derives an expression for the likelihood ratio $L_{P|T}$ that the target in track will be in a certain radar cell in the next scan. The residual statistics for the vector difference $\tilde{z}$ between an exact position in the four-dimensional radar measurement domain and the prediction $s_{k+1|k}$ for scan k+1 are given by the pdf $$f(\tilde{z}) = \frac{\exp\left(-\frac{1}{2}\tilde{z}^T(HP_{k+1|k}H^T)^{-1}\tilde{z}\right)}{\sqrt{|2\pi HP_{k+1|k}H^T|}} \quad (12)$$

where H is the observation matrix as in standard extended Kalman track filtering (see for example Blackman, S. S. and Popoli, R <<Design and Analyses of Modern Tracking Systems>>, Norwood, Mass.: Artech House, 1999). For a radar cell in scan k+1 with cell center in range, bearing, elevation, and doppler $z_{cell,k+1}=[r_{cell,k+1}\ b_{cell,k+1}\ e_{cell,k+1}\ v_{cell,k+1}^d]^T$ one can calculate the probability $p_{p|t}$ that the target will lie in it by integrating the pdf f(z̄) of (12) over the four-dimensional radar cell volume $$p_{p|t}(z_{cell,k+1}) =$$

(13)

$$\int_{r_{cell,k+1}-\frac{RBSize}{2}}^{r_{cell,k+1}+\frac{RBSize}{2}} \int_{v^d_{cell,k+1}-\frac{DBSize}{2}}^{v^d_{cell,k+1}+\frac{DBSize}{2}} \int_{b_{cell,k+1}-\frac{BISize}{2}}^{b_{cell,k+1}+\frac{BISize}{2}} \int_{e_{cell,k+1}-\frac{EBWidth}{2}}^{e_{cell,k+1}+\frac{EBWidth}{2}} f\left(\begin{bmatrix} r \\ b \\ e \\ v^d \end{bmatrix} - h(s_{k+1|k})\right) de\, db\, dv_d\, dr$$

where RBSize, DBSize, BISize, and EBWidth are the range-bin size, doppler-bin size, bearing interval size of a burst, and elevation beam width respectively, and h is the standard (nonlinear) transformation function from the state space to the radar measurement domain (see for example Blackman, S. S. and Popoli, R previously cited). In the actual TBD algorithm one approximates this integral by a Riemann sum, where for a radar application using two points per dimension is found to suffice.

For a track based on noise measurements, there is no preference for any of the $N_{RC,k+1}$ radar cells in the validation gate of scan k+1. Therefore, all radar cells have an equal probability $p_{p|n}$ of $1/N_{RC,k+1}$. Thus, the likelihood ratio $L_{P|T}$ based on the position of the radar cell is given by $$L_{P|T} = \frac{p_{p|t}}{p_{p|n}} = \frac{p_{p|t}}{1/N_{RC,k+1}} \quad (14)$$

with $p_{p|t}$ given by (13).

By combining the likelihood ratio based on the measured signal strength $L_{S|T}$ and that based on the radar cells position $L_{P|T}$, one arrives at the likelihood ratio $L_{SP|T}$ that a measurement is target originated based on both the measured signal strength and the position in the prediction window $$L_{SP|T} = L_{S|T}L_{P|T} = \left(\frac{2\sigma^2}{\overline{A}^2_{k|k,\cdots,k-(N_s-1)}}\right)^{N_b} \exp\left[\left(1 - \frac{2\sigma^2}{\overline{A}^2_{k|k,\cdots,k-(N_s-1)}}\right)\sum_{i=1}^{N_b} \frac{(A^i_{k+1})^2}{2\sigma^2}\right] \frac{p_{p|t}}{1/N_{RC,k+1}} \quad (15)$$

where again $p_{p|t}$ is given by (13). It is this likelihood ratio upon which the method according to the invention bases the data-association, or radar cell selection in the basic approach to recursive filtering based TBD algorithm design.

The Recursive Filtering Based (RFB) TBD algorithm can be initiated with the preselection plot $\underline{P}_0$ in scan k=0. The preselection plot consists of the measurement position $z_0^P = [r_{cell,0}\ b_{cell,0}\ e_{cell,0}\ v^d_{cell,0}]^T$ (i.e. equal to the preselection radar cell center) with associated measurement error covariance R equal to that of a Gaussian approximation of a uniform probability density over the radar cell volume $$R = diag\left(\left[\frac{RBSize^2}{12}\ \frac{BISize^2}{12}\ \frac{EBWidth^2}{12}\ \frac{DBSize^2}{12}\right]\right) = \quad (16)$$

$$diag\left(\left[\sigma^2_{r,q}\ \sigma^2_{b,q}\ \sigma^2_{e,q}\ \sigma^2_{v^d,q}\right]\right)$$

Next to the measurement position, the preselection plot consists of the measured amplitudes $\underline{A}_0 = \{A_0^1, \ldots, A_0^{N_b}\}$ the $N_b$ bursts considered for that radar cell. Through proper transformation to state space of the preselection plot measurement position (taking into account the unknown tangential velocity component) and averaging of the measured amplitudes, the initial track attributes $s_{0|0}$, $P_{0|0}$, and $\overline{A}_{0|0}$ for scan k=0 are obtained.

Now, applying the RFB-TBD algorithm backward in time to process the previous $N_s-1$ scans is equal to applying it forward in time, which will be presented later, except that a state transition matrix $F_{-1}$ one scan backward in time is used instead of the standard state transition matrix F one scan forward. The result of processing the previous scans is that the $N_s-1$ radar cells in the previous scans that most likely contained the target have been recursively associated to the track, with measurement positions $z_k^{ML}$ and measured amplitudes $\underline{A}_k$ where $k=\{-1, \ldots, -(N_s-1)\}$. Also the integration sum $SumE_{0|0, \ldots, -(N_s-1)}$ for the first integration period is available and the average target amplitude $\overline{A}_{0|0, \ldots, -(N_s-1)}$.

If the integration sum for the first integration period is above the threshold, a target track detection can already be declared at scan k=0. If the threshold was not exceeded or to enter the track maintenance phase, one has to proceed forward from scan k=0. Before proceeding with the forward TBD processing however, the initial state vector $s_{0|0}$ and associated error covariance $P_{0|0}$ have to be updated with the associated measurement positions $z_k^{ML}$ in the previous $N_s-1$ scans. If this recursively starting is done with the measurement position $z_{-1}^{ML}$ in the first scan back, then updating with the measurement position $z_{-n_s}^{ML}$ in the $n_s$-th scan back is given by $$K = P_{0|0, \ldots, -(n_s-1)}(HF_{-n_s})^T[HF_{-n_s}P_{0|0, \ldots, -(n_s-1)}(HF_{-n_s})^T + R]^{-1} \quad (17)$$

$$s_{0|0, \ldots, -n_s} = s_{0|0, \ldots, -(n_s-1)} + \hat{p}_{-n_s}{}^t K[z_{-n_s}^{ML} - h(s_{0|0, \ldots, -(n_s-1)})] \quad (18)$$

$$P_{0|0, \ldots, -n_s} = (I - \hat{p}_{-n_s}{}^t KHF_{-n_s})P_{0|0, \ldots, -(n_s-1)} \quad (19)$$

Here K is the Kalman gain and $F_{-n}$ the state transition matrix over n scans backwards. In the backward TBD processing part and the updating with the resulting measurement positions, the target dynamics are modeled as experiencing no random perturbations, i.e. the process noise is set to zero. This is in accordance with conventional tracking systems, where track initialization is only done for exact straight target trajectories to reduce the number of initializations on false alarms.

While these equations are in principle derived from the standard extended Kalman track filter, one can also use as so-called information reduction factor (see Li, X. R. and Bar-Shalom, Y "Tracking in clutter with Nearest Neighbor Filter: Analysis and Performance" IEEE Trans. On Aerospace and Electronics Systems, vol. 32, no. 3, July 1996, pp. 995–1009) the probability $\hat{p}_{-n_s}{}^t$ that the associated radar cell with measurement position $z_{-n_s}^{ML}$ is target originated. In this way the uncertainty of misassociation is taken into account by updating weighted with the probability $\hat{p}_{-n_s}{}^t$. This probability can be derived from the likelihood ratio $L_{SP|T}^{-n_s}$ of the associated radar cell from the $n_s$-th scan back as $\hat{p}_{-n_s}{}^t = L_{SP|T}^{-n_s}/(1+L_{SP|T}^{-n_s})$, since the likelihood ratio is defined as the probability that the measurement is target originated divided by the probability that it contains noise. The information reduction factor will analogously be applied in the scan processing part of the RFB-TBD algorithm.

To describe the forward scan processing part of the RFB-TBD algorithm, it is possible to start at the point where the radar cell with maximum likelihood ratio $L_{SP|T}{}^k$ has been found in scan k. Then, updating the predicted state vector $s_{k|k-1}$ and associated error covariance $P_{k|k-1}$ with the measurement position $z_k{}^{ML}$ using the probability $\hat{p}_k{}^t = L_{SP|T}{}^t/(1+L_{SP|T}{}^k)$ as information reduction factor is given by $$K = P_{k|k-1} H^T [H P_{k|k-1} H^T + R]^{-1} \quad (20)$$

$$s_{k|k} = s_{k|k-1} + \hat{p}_k{}^t K [z_k{}^{ML} - h(s_{k|k-1})] \quad (21)$$

$$P_{k|k} = (I - \hat{p}_k{}^t K H) P_{k|k-1} \quad (22)$$

where one now only indicates the scan number of the last scan from which data has been used to estimate a state vector or error covariance; the first scan from which data has been used always is scan $k = -(N_s - 1)$. For the calculation of the average amplitude $\overline{A}_{k|k, \ldots, k-(N_s-1)}$ of the last $N_s$ scans (including scan k), one takes the squared amplitudes of each radar cell into account weighted with the target probability $\hat{p}_k{}^t$, and weighted with the noise probability $\hat{p}_k{}^n = 1 - \hat{p}_k{}^t$ a squared amplitude corresponding to a linear SNR of zero $$\overline{A}_{k|k,\cdots,k-(N_s-1)} = \sqrt{\frac{\sum_{l=0}^{N_s-1}\left(\hat{p}_{k-l}^t \sum_{i=1}^{N_b-1}(A_{k-l}^i)^2 + \hat{p}_{k-l}^n N_b 2\sigma^2\right)}{N_s N_b}} \quad (23)$$

Analogously, the integration sum is calculated as $$SumE_{k|k,\cdots,k-(N_s-1)} = \sum_{l=0}^{N_s-1}\left(\hat{p}_{k-l}^t \sum_{i=1}^{N_b-1}\frac{(A_{k-l}^i)^2}{2\sigma^2} + \hat{p}_{k-l}^n N_b\right) \quad (24)$$

The integration sum $SumE_{k|k, \ldots, k-(N_s-1)}$ is the integrated signal strength that is thresholded to declare a target track detection at scan k. The prediction of the kinematic and energetic track attributes for scan k+1 is given by $$s_{k+1|k} = F s_{k|k} \quad (25)$$

$$P_{k+1|k} = F P_{k|k} F^T + Q \quad (26)$$

$$\overline{A}_{k+1|k, \ldots, k-(N_s-1)} = \overline{A}_{k|k, \ldots, k-(N_s-1)} \quad (27)$$

where now a non-zero process noise covariance Q is used to model the random target dynamics.

In scan k+1, the method according to the invention first use the gating criterion $d^2 = \tilde{z}^T (H P_{k+1|k} H^T)^{-1} \tilde{z} \leq G$ to select the radar cells in the validation gate, where a gate G is chosen guaranteeing a fixed probability that the target will lie within the resulting validation gate (see for example Blackman and Popoli previously cited). Using the predicted state vector $s_{k+1|k}$ and associated error covariance $P_{k+1|k}$, and the estimated target amplitude $\overline{A}_{k+1|k, \ldots, k-(N_s-1)}$ one calculates according to (15) the likelihood ratio that the target is in the radar cell for all radar cells in the validation gate, based on the radar cells position and the measured amplitudes projected into it. The last step of the RFB-TBD algorithm is to associate the radar cell with the maximum likelihood ratio $L_{SP|T}{}^{k+1}$ to the track.

It is possible to use a Particle filter as track filter. A Particle filter is particularly described in Y. Boers and J. N. Driessen <<Particle Filter Based Detection For Tracking>> Proc. of the American Control Conference Jun. 25–27, 2001 Arlington, Va. In this case the raw data in a validation gate are input for the track filter calculating the conditional probability density of the state given the measurement data. This probability density is used to estimate the target state and likelihood of target presence, the latter being used for thresholding on track level.

The recursive filtering based TBD algorithm can be implemented for example for application of a pulse-doppler surveillance radar with multi-beamforming in elevation of which mission is to detect multi-targets. This algorithm is well suited for processing multiple elevation beams.

The important radar parameters in this context are in this example that the radar rotation time is 5 seconds, the bearing interval of a burst is BISize=0.85°, the radar beamwidth in bearing is 2.2°, the radar beamwidth in elevation is EBWidth=5.0°, the range-bin size is RBSize=80 m, and the doppler-bin size is DBSize=12 m/s. From the radar beamwidth in bearing and bearing interval of a burst, it is possible to derive that approximately 2.6 bearing intervals fit within the radar beamwidth. To ensure that independent of the relative position of the bursts on target, an area in bearing equal to the radar beamwidth is covered, the number of integrated bursts each scan has been chosen $N_b = 4$.

A target RCS (Radar Cross Section) can be modeled as having a mean of 5 m² and being distributed as a $\chi^2$ pdf with two degrees of freedom and independent from burst to burst. The targets initial position and velocity of the fighter-bomber in the radar domain are:

Range random between 150 km and 500 km.
Elevation equal to the center of the elevation beam (2.66°).
Bearing of 0°.
Radial velocity of 300 m/s plus a random offset between plus and minus half the doppler-bin size DBSize.
Tangential velocity of 0 m/s.

It is assumed that the target does not accelerate, and just moves according to the initial conditions along a constant velocity trajectory.

As recursive track filter it is possible to use a filter tracking the three-dimensional position and velocity with a piecewise constant white acceleration model (as for example described in Blackman, S. S. and Popoli, R) for the target dynamics, where the standard deviation of the random accelerations is set to 1 m/s², corresponding to a maximum assumed acceleration of 0.2 g. The maximum assumed target velocity taken into account in the track filter initialization is 1000 m/s.

In this example a run consists of 4 scans to determine the detection probability for the $N_s - 1$ scans back and forward RFB-TBD initialization method upon a preselection. Analogous to the theoretical detection probability derivation, this is accomplished by allowing each of the 4 scans of a run to generate a preselection upon which the RFB-TBD algorithm is started. The initial range is chosen randomly to obtain the detection probability from 500 km, where it would be nearly 0 for TBD processing, until 150 km, where it would be nearly 1 for conventional processing. On a smaller scale, randomly choosing the initial range introduces a straddling loss since the target range varies relative to the position of the range-bins. For the same reason, also the initial radial velocity is chosen randomly within a bracket equal to the doppler-bin size around a nominal velocity.

In order to compare the results with that for conventional processing and with the maximum performance possible for a TBD processing, it is possible to process the same data through an idealized conventional and TBD processing. The 'idealized' character of these processings is that of each scan the received signal strength in the true bursts on target at the true range, doppler, and (of course) elevation are fed into the conventional and TBD detection schemes. In each case a false alarm probability on track level of $P_{FA}{}^t=10^{-10}$ has been used. The results are in particular given in FIG. 4.

Figure 4:
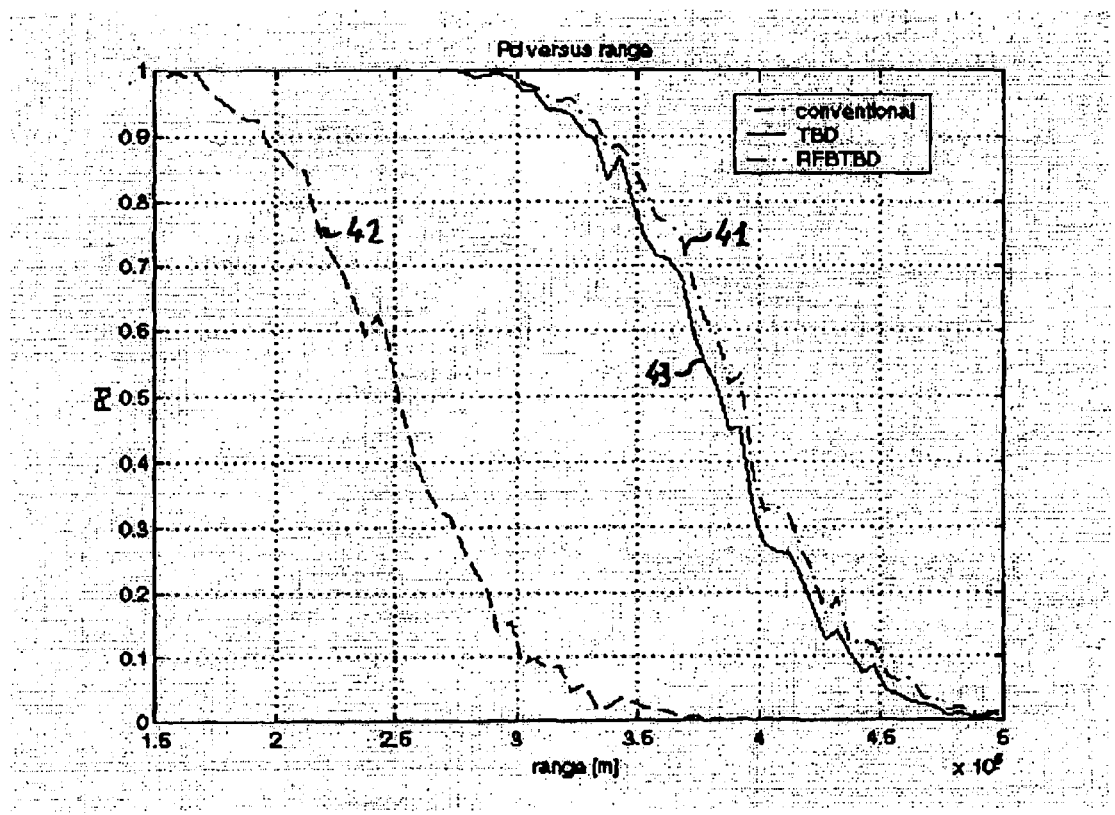
FIG. 4 shows detection probability of the proposed TBD processing according to the invention, and idealized conventional and TBD processing for the application of a pulse-doppler surveillance radar with multi-beamforming in elevation detecting targets.

In FIG. 4 the detection probability versus the range is plotted for the RFB-TBD processing (curve 41), and the idealized conventional (curve 42) and TBD processings (curve 43). These results are based on about 28000 runs, resulting in an average of 400 runs per 5 km range bracket. From the runs in each 5 km range bracket the probability of detection has been determined.

From FIG. 4, it appears that the RFB-TBD processing actually outperforms the idealized TBD processing. This is the result of the ability of the RFB-TBD algorithm to profit from noise peaks in radar cells next to the exact radar cell the target is in. As noted in e.g. Kirlin, R. L. and Marama, B. H. <<The Effect of Noise-Only Tracks on the Performance of a Combined Detection and Tracking Algorithm>>, IEEE Trans. On Aerospace and Electronic Systems, vol.33, no. 1, January 1997, pp. 329–333, one has to penalize for the fact that in a TBD processing multiple target trajectories have been considered, one of which leading to a target track detection. The search area restricting character of the RFB-TBD algorithm suggests that this penalty will be limited. When the exact target position is near the border of two radar cells, the target power is approximately equal for both radar cells. The noise realization differs, however, occasionally resulting in a higher amplitude in a radar cell next to the exact radar cell the target is in. A conclusion is that, at least in the initialization phase, the recursive filtering based approach, i.e. restricting the search area to the validation gate of a track filter and only associating the radar cell that most likely contains the target, does not reduce the detection performance.

With respect to the conventional processing, as can be derived from the 0.9 detection ranges, a gain of 8.4 dB is achieved for a detection probability of 0.9, which is even more than the theoretical detection probability. This can be explained from the fact that the target power is not equal for all bursts on target in a scan, as is assumed in the theoretical derivation. As the radar beam scans over the target, the target power level will follow the beamshape in bearing. For a TBD processing, the result is that the integrated signal strength corresponds to a lower average power level than that in the center of the beam. For a conventional processing, however, this means that for the two outer bursts of the four bursts on target the hit detection probability is much lower than for the two inner bursts. This has a much stronger (negative) effect on the detection probability for the 3 out of 4 detection criterion on plot level of the conventional detection scheme (and thus on the track detection probability), than the lowered average power over the bursts on target has on the track detection probability of the TBD detection scheme.

A recursive filtering based approach to TBD can be used for surveillance radar. Straightforwardly derived from this approach, an initial RFB-TBD algorithm has been given using for example a Kalman track filter as recursive filter which is updated with the radar cell that most likely contains the target each scan. Next to this, a preselection scheme has been introduced where only for those radar cells in a scan that have exceeded a preselection threshold a TBD processing is initiated that also processes a limited number of scans backward. Through a theoretical detection performance analysis, the applicant has shown that using this preselection scheme to initiate a TBD processing, the computational demands can be significantly reduced at a negligible loss in detection performance. Simulation results carried out by the applicant indicate that the theoretical TBD performance can be achieved using the proposed RFB-TBD processing for track initialization.

More generally, the invention can also be used to increase detection performance for sensor systems where processing power limitations render brute-force track-before-detect architectures useless in practice. Finally, the invention is simple to implement.

The invention has been described for a surveillance radar, however it can be applied for all kind of radars, such as for example search, track or multi-functions radars.

What is claimed is:

1. A method for detecting a target having a radar including transmitter means for generating bursts of radar pulses, each scan of a radar having of a number ($N_b(k)$) of bursts for each scan k, the method comprising the steps of:
   a) pre-selecting a radar cell by a detection process;
   b) initializing a Track-Before-Detect process upon the pre-selected cells, using a track filter to construct a validation gate associated to the next scan k+1;
   c) using the data an the validation gate of scan k+1 to update the Track-Before-Detect process and using the data to construct the validation gate associated to the next scan k+2;
   step (c) being repeated scan to scan.

2. The method as claimed in claim 1, wherein in the preselection step, the Track-Before-Detect processes the raw data of the validation gate for a limited number of scans backward and forward.

3. The method as claimed in claim 2, wherein the Track-Before-Detect processes $N_s-1$ scans back and subsequently $N_s-1$ scans forward.

4. The method as claimed in claim 2, the raw data in a validation gate are transformed into a virtual plot characterised by a range position, a doppler speed, an elevation position, a bearing position and an integrated signal strength, this range, doppler, elevation and bearing information being used as an input for the track filter, the integrated signal strength being together with the integrated signal strengths of other scans used for thresholding on track level.

5. The method as claimed in claim 4, wherein the integration being over $N_s$ scans with $N_b(k)$ bursts on target each scan, the integration sum sumE to be thresholded, leading to a track detection, is equal to a sum of independent Rayleigh distributed power measurements x (k,b):

$$SumE = \sum_{k=1}^{Ns} \left[ \sum_{b=1}^{Nb(k)} x(k, b) \right]$$

6. The method as claimed in claim 2, wherein the raw data in a validation gate are transformed into a virtual plot characterised by a range position, a doppler speed, an elevation position, a bearing positron and an integrated signal strength, this range, doppler, elevation and bearing information being used as an input for the track filter, the integrated signal strength being together with the position data used to calculate a likelihood, this likelihood being together with the likelihood of other scans used for thresholding on track level.

7. The method as claimed in claim 2, wherein the raw data in a validation gate are input for a track filter calculating the conditional probability density of the state given the measurement data, this probability density being used to estimate the target state and likelihood of target presence, the latter being used for thresholding on track level.

8. The method as claimed in claim 6, wherein the integrated likelihood over Ns scans to be thresholded, leading to a track detection, is equal to the product of the likelihoods of the separates scans.

9. The method as claimed in claim 1, wherein the track filter is a recursive filter.

10. The method as claimed in claim 1, wherein the track filter is a Kalman filter.

11. The method as claimed in claim 9, wherein the track filter is a particle filter.

12. The method as claimed in claim 1, wherein the track filter:
   a) selects the data that has to be considered for association from each scan;
   b) associates from the data within the validation gate the data that is most likely to have originated from the target in the track;
   c) updates track attributes with the associated data;
   d) predicts track attributes in the next scan from the updated track attibutes.

13. The method as claimed in claim 12, wherein the outcome of the trackfiltering, the predicted track attributes, is used to construct the validation gate and this validation gate is used to select the raw data to be used for the next track update.

14. The method as claimed in claim 12, wherein the track attributes comprise kinematic attributes.

15. The method as claimed in claim 12, wherein the track attributes comprise energetic attributes.

16. The method as claimed in claim 12, wherein when initiating a track, the updated attributes are updated on the attributes of the preselected cell.

17. The method as claimed in claim 5, wherein a track is deleted when the integration sum sumE is below the threshold for a number or scans in a row.

18. The method as claimed in claim 8, wherein the track is deleted when the over Ns scans integrated likelihood is below the threshold for a number of consecutive scans.

19. The method as claimed in claim 12, wherein it is applied to a surveillance radar beamforming elevation.

20. The method as claimed in claim 1, wherein step a) is performed first.

21. The method as claimed in claim 1, wherein step b) is performed after step a).

22. The method as claimed in claim 21, wherein step c) is performed after step a).

23. The method as claimed in claim 12, wherein a track is deleted when the integration sum sumE is below the threshold for a number of scans in a row.

24. The method as claimed in claim 12, wherein the track is deleted when the over Ns scans integrated likelihood is below the threshold for a number of consecutive scans.

* * * * *